United States Patent [19]
Sawyer

[11] 3,886,947
[45] June 3, 1975

[54] NON-THROMBOGENIC CATHETER
[75] Inventor: Philip N. Sawyer, Brooklyn, N.Y.
[73] Assignee: Meadox Medicals, Inc., Oakland, N.J.
[22] Filed: Apr. 13, 1973
[21] Appl. No.: 351,051

[52] U.S. Cl......... 128/348; 003/001; 003/DIG. 3–1; 128/002.05 R; 128/334 R
[51] Int. Cl...................... A61b 5/02; A61m 25/00
[58] Field of Search.................. 003/001, DIG. 3–1; 128/2.05 R, 334 R, 348

[56] References Cited
UNITED STATES PATENTS
3,609,768 10/1971 Ayres.................................. 003/001
3,633,578 1/1972 Roth et al. ............... 128/214 R UX
3,663,288 5/1972 Miller ............................ 003/DIG. 1

OTHER PUBLICATIONS
Costello, M. et al, "Correlations Between Electrochemical and Antithrombogenic Characteristics of Polyelectrolyte Materials." Trans. Amer. Soc. Artific. Int. Org. XVI: 1–6.1970.

Primary Examiner—Channing L. Pace
Attorney, Agent, or Firm—Blum Moscovitz Friedman & Kaplan

[57] ABSTRACT

A catheter suitable for insertion into veins and arteries has an outer surface which is antithrombogenic. One such surface is acidic and is partially neutralized with metallic ions. A catheter in accordance with the present invention is non-thrombogenic and is essentially free of tendency to cause thrombosis, thrombophlebitis or periphlebitis.

7 Claims, 2 Drawing Figures

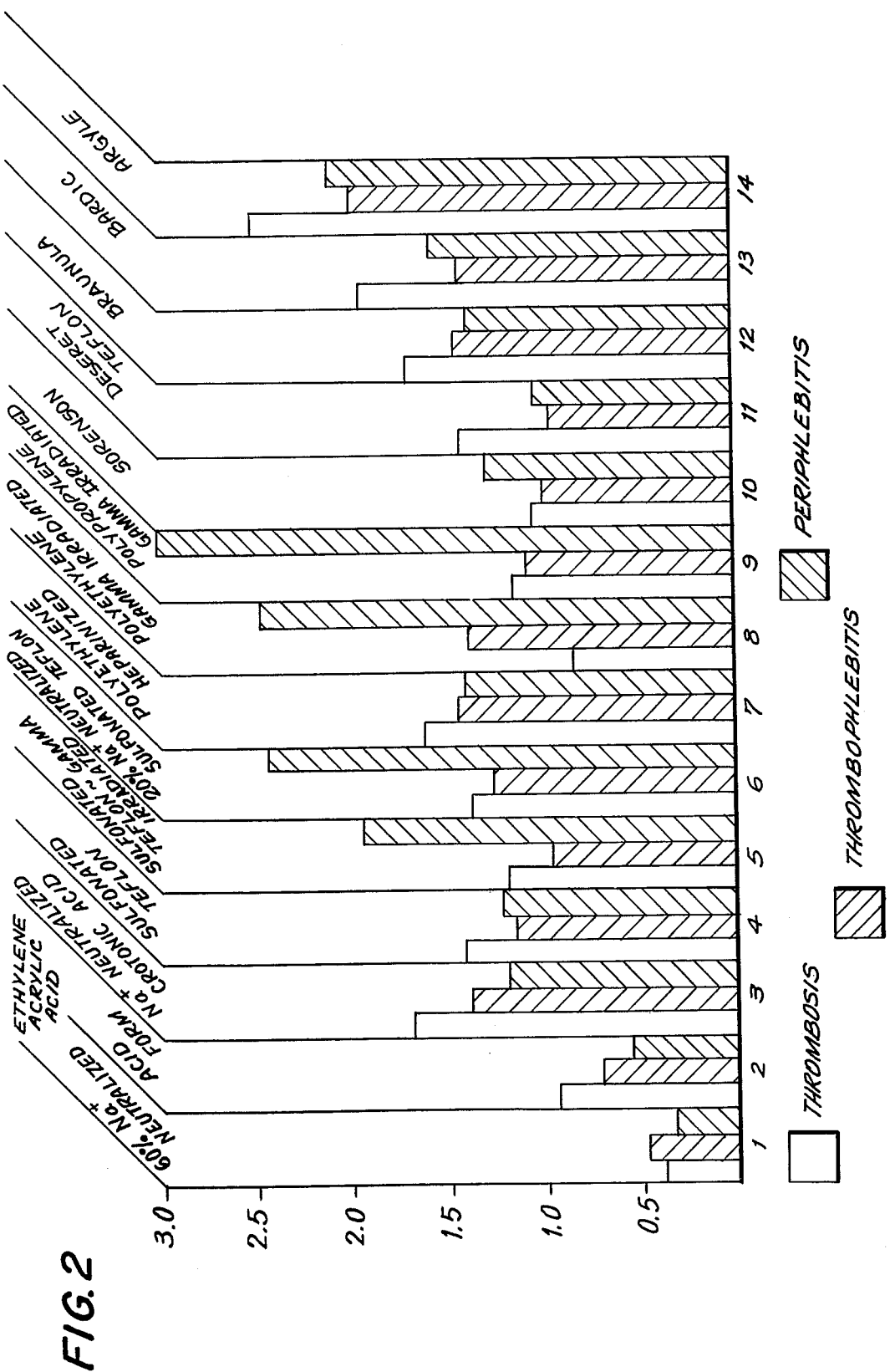

NON-THROMBOGENIC CATHETER

BACKGROUND OF THE INVENTION

With the development of highly inert organic polymers many attempts have been made to use devices utilizing such materials within living mammalian bodies. Particularly important examples of attempts to use such polymers are in the construction of heart valves and as replacements for defective blood vessels. Another most interesting example is for insulation of the wires used in pacemakers. Despite the extremely high chemical inertness of materials such as the many Teflons, polyethylene, and polypropylene, it has been found that such materials are eventually either chemically attacked by the various fluids in the body or cause thrombosis. When used for intravascular cannulae thrombosis, thrombophlebitis, and over the long term periphlebitis, may result even when heparinized. These effects are particularly severe at junctions between the natural vascular walls and the polymeric insert.

It is known that copolymers of acidic monomers such as acrylic acid with ethylene in proper proportion, when partially neutralized, again in proper proportion, with metallic ions show very little tendency to cause thrombosis, thrombophlebitis, periphlebitis or fibrosis when placed within blood vessels. A most desirable use for such polymers would be as vascular replacements for defective sections of blood vessels. When such copolymers are used in this way, none of these effects occur to any appreciable extent within the polymeric section itself, but there is generally thrombus formation at the junctions between the polymeric tube section and the blood vessel itself increasing in frequency and intensity with implantation time. Consequently, use of such copolymers as vascular sections is limited. Nevertheless, the fact that there are no undesirable effects either within or outside the tube itself indicates that such materials warrant study with respect to other uses. A particularly valuable use for such a tube would be a catheter serving to introduce solutions of food, medication, contrast media and monitoring devices into selected blood vessels. In addition to absence of toxicity in the modes indicated, the material from which such a catheter is to be made must be formable, preferably by extrusion, be sterilizable, have adequate strength and flexibility and be reasonable in cost. Where a catheter is to remain within the blood vessel for an extended period (say, up to 3 weeks), it must be resistant to corrosion by the body fluids; otherwise, it would be impossible to leave the catheter in place, even if the products of corrosion were completely free of toxicity.

SUMMARY OF THE INVENTION

Catheters consisting of a copolymer of an acidic material and ethylene wherein the acidic content lies between about 9.8 and 19.2% and wherein from 29 to 71% of the acidic groups present are neutralized either with sodium or potassium are relatively free of tendency to cause thrombosis, thrombophlebitis, periphlebitis or fibrosis and are strongly resistant to corrosion by body fluids. Such catheters can be placed in blood vessels for the purpose of introducing solutions of food, medicaments, contrast media and monitoring devices over extended periods of time. It should be noted that only the outer surface of the catheter must be essentially free of toxic effects and resistant to corrosion.

Accordingly, an object of the present invention is to provide an improved catheter suitable for intravascular insertion, said catheter being essentially free of tendency to cause thrombosis, thrombophlebitis, periphlebitis or fibrosis.

Another object of the present invention is to provide an improved catheter suitable for introduction of solutions of foods or medicaments, contrast media and monitoring devices into blood vessels over substantial periods of time without causing any of the aforenoted effects.

A further object of the present invention is to provide an improved catheter of which at least the outer surface consists of a partially neutralized copolymer of an acid and ethylene, such a material being termed an "ionomer."

Still other objects and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 2 is a bar graph showing the relative thrombogenicity of the polymers tested in the form of catheters.

DESCRIPTION OF THE PREFERRED EMBODIMENTS

Figure 1:
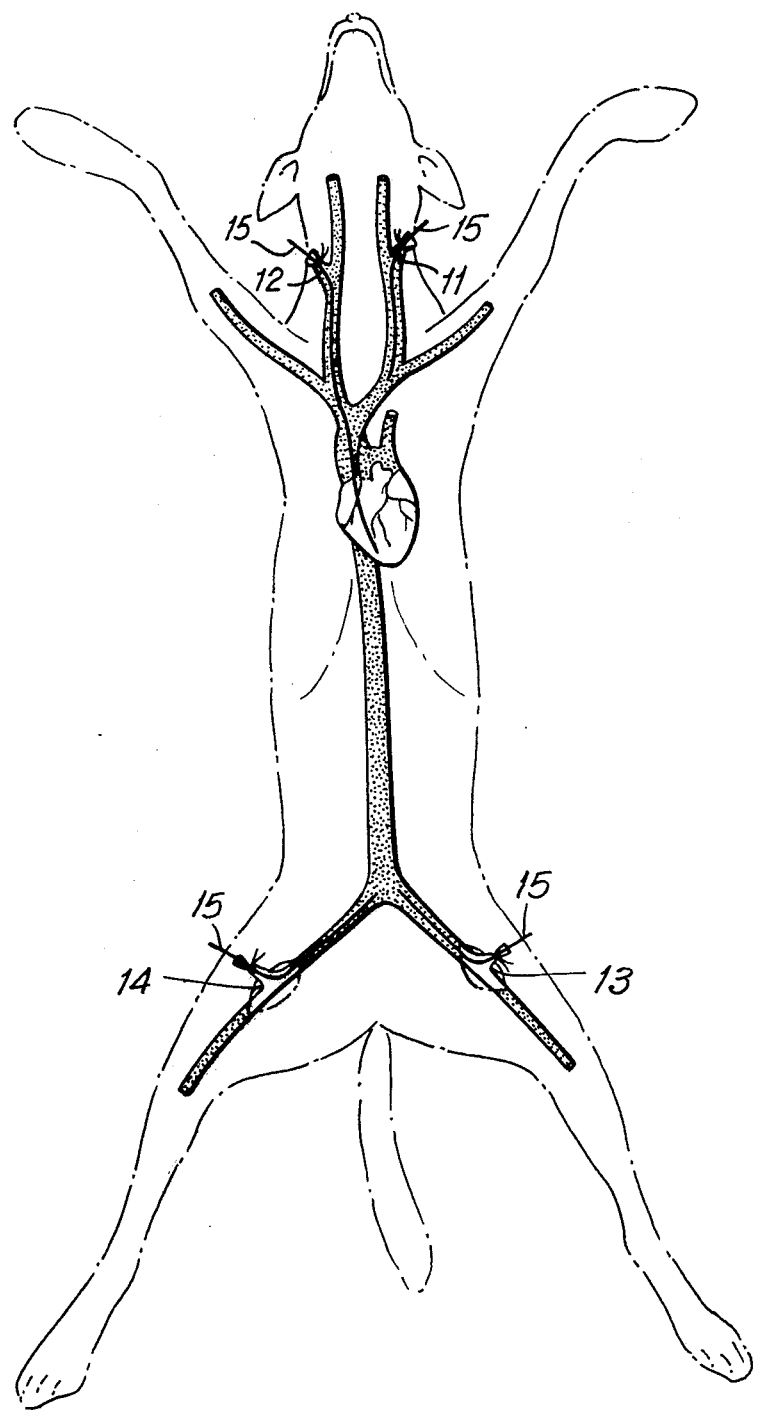
FIG. 1 is a plan view of a dog in which are inserted catheters in accordance with the present invention and commerically available catheters.

The relative thrombogenicities of polymer surfaces in accordance with the present invention were established by introducing catheters 15 (FIG. 1) into the venous flow of the left or right jugular and femoral veins of pure-bred standard female Beagle hounds (FIG. 1, reference numerals 11, 12, 13 and 14, respectively). The objective was to find a material which could be used as a long term indwelling intravenous or intra-arterial infusion catheter and for cardiac catheterization. The catheters were kept in the region of implantation for varying lengths of time at the end of which the dog was sacrificed so that the blood vessels could be examined and the catheter itself could be examined with respect to thrombogenicity. The degree of thrombogenicity was rated from 0 to 4 with 4 being the highest. Table 1 lists the various materials tested.

The degrees of thrombogenicity, phlebitis and periphlebitis were judged by a physician immediately after removal of the test catheters from the test animals. A sufficient number of tests were run with catheters in each of the four locations in test dogs to permit the development of reliable statistical data. After examination of each catheter on removal from the test animal, the catheter was photographed and then immersed in formaldehyde to preserve any thrombus deposit on the catheter. Finally, each preserved specimen was examined by the director of the group, the director up to this point being uninformed of and therefore unprejudiced by the judgement rendered by the previous evaluator.

TABLE 1

MATERIALS TESTED

| Sample No. | Polymer | Gamma Irradiated | Heparinized | Degree of Neutralization | Source |
|---|---|---|---|---|---|
| 1 | 81% ethylene 19% acrylic acid | + | − | 60% | — |
| 2 | 81% ethylene 19% acrylic acid | + | − | 0% | — |
| 3 | Crotonic acid | − | − | 100% | — |
| 4 | Sulfonated Teflon | − | − | 0% | — |
| 5 | do. | + | − | 0% | — |
| 6 | do. | + | − | 20% | — |
| 7 | ethylene | + | + | — | — |
| 8 | do. | + | − | — | — |
| 9 | propylene | + | − | — | — |
| 10 | — | | | | Sorenson |
| 11 | — | | | | Deseret Teflon |
| 12 | — | | | | Braunula |
| 13 | — | | | | Bardic |
| 14 | — | | | | Argyle |

NOTE: Samples 10 through 14 are commercially available catheters. The details of preparation are not known. The Braunula catheter is made in Germany.

The full complement of test results was evaluated statistically and the averages are shown in bar graph form in FIG. 2. It is immediately apparent that the most satisfactory catheter is that made of material No. 1. This is an ethyleneacrylic acid copolymer which contains 19.2% by weight of acrylic acid. Also, 60% of the acrylic acid is neutralized with sodium. The purpose of the gamma-irradiation is to sterilize the material. The partially-neutralized ethylene-acrylic acid copolymer retains its anti-thrombogenicity through at least a period of 3 weeks, the maximum period tested.

The sulfonated Teflons (Nos. 4–6) appeared to give best results in the acidic form without gamma-irridation (No. 4). There was early thrombus formation on almost all of the sulfonated Teflon tubes whether unsterilized or sterilized. There was little difference whether the tubes were partially neutralized with sodium or were in their native state. They all tended to display small amounts of surface deposition fairly early which did not necessarily progress to a much greater level as time went on to 21 days.

All of the cross-linked heparinized surfaces provied to have substantial anti-thrombogenic characteristics for implantation periods up to 2 hours. At 24 hours these surfaces began to colleet sizable amounts of thrombus and by 7 days were essentially completely covered with thrombus, usually well organized.

The Argyle "Medicuts" catheter (No. 14) was used to represent a control surface, since this is considered by many to be one of the better presently available catheters. This material proved to be relatively anti-thrombogenic for periods of up to 1 day. However, beyond this point there was almost universal thrombus deposition on all surfaces involved.

The tests with catheters were supplemented by tests in which blood was passed through tubing of various materials. In all cases partially neutralized ethylene-acrylic acid copolymers were employed. Copolymers having 19.2, 14.7 and 9.8% of acrylic acid by weight were tested. Although anti-thrombogenicity was found in copolymers having as little as 9.8% of acrylic acid, best results were obtained at 19.2%.

A variety of neutralizing ions have been tested. Included were sodium, potassium, calcium and magnesium. In decreasing anti-thrombogenicity the order was sodium, potassium, calcium and magnesium. Degrees of neutralization ranged from 29.0 to 71.0%. Neutralization to the extent of 60% with sodium proved to be the optimum. The magnesium-treated polymers proved to be strongly thrombogenic and calcium-treated materials somewhat less so.

The acrylic acid-ethylene copolymer tested is most suitable from every standpoint. A wide variety of acidic monomers of low molecular weight, when copolymerized with ethylene and partially neutralized with Na or K are also suitable as catheter materials. Further, there is no apparent reason to be seen why a coating of materials as disclosed, on a base of another material, even if thrombogenic, would not be equally effective.

Based on research activities to date, materials which might well behave similarly are copolymers of maleic anhydride and fumaric acid with ethylene in which the weight content of the acid ranges from 2 to 20% and in which approximately 60% of the acid groups (the maleic anhydride having converted to maleic acid) are neutralized with sodium or potassium.

As is evident from the data presented, catheters which are negatively charged on the outer surfaces thereof by reason of ionization are essentially non-thrombogenic. Moreover, solubility of such copolymers is extremely low so that both periphlebitis and phlebitis are not caused.

Neutralization by positive ions gives some effect at almost every level of neutralization, but farily sharp optima are present for each type of positive ion. electrochemical measurements indicate that maximum anti-thrombicity is exhibited when the charge density on the surface of the catheter is about 1 electron/1000 square A. The positive ions, sodium and potassium, are the materials of choice based on experimental evidence.

A critical point is that the catheter when implanted in a blood vessel must not materially interfere with blood flow therethrough, else thrombosis will be caused by the catheter regardless of its composition, thrombosis being caused by prevention of flow in a region proximate the catheter rather than by the presence of the catheter as a foreign body.

The value of a catheter which does not cause side effects is enchanced by the growing tendency to keep catheters in position for extended periods of time for alimentation and medication. Although tests thus far have been carried out for no longer than 3 weeks, the non-thrombogenicity of the catheter materials described herein can be regarded as essentially permanent, since replacement of catheters at intervals of 3 weeks does not present a serious difficulty either so far as the patient or the attending physician is concerned.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A catheter suitable for introduction of monitoring devices and of solutions of foods, drugs and contrast media into veins and arteries, and having no more than negligible tendency to deposit thrombus or cause thrombosis, thrombophlebitis, periphlebitis or fibrosis, comprising a tubular structure suitable for insertion into a natural or artificial opening in a body, said tubular structure including an outer surface consisting of an acidic copolymer partially neutralized with sodium or potassium so that on intravascular insertion of said catheter the outer surface of said catheter becomes negatively charged as the result of release of positive $Na^+$ or $K^+$ ions into the environment, said negatively charged surface being non-thrombogenic.

2. A catheter as defined in claim 1, wherein said polymeric material is a copolymer of ethylene and acrylic acid.

3. A catheter as defined in claim 2, wherein said polymeric material has an acrylic acid content of about 10 to about 20% by weight, the remainder being copolymerized ethylene.

4. A catheter as defined in claim 3, wherein about 60% of the acid groups in said polymeric material are neutralized with a metallic ion chosen from the group consisting of $Na^+$ and $K^+$.

5. A catheter as defined in claim 1, wherein said catheter further comprises an unstretched inner tube and an outer tube in the form of a coating on said inner tube, said coating being an acidic copolymer which is partly neutralized with one or more ions selected from the group consisting of $Na^+$ and $K^+$.

6. A catheter as defined in claim 5, where said outer tube contains from about 10 to 20% by weight of acrylic acid copolymerized with ethylene, and neutralized to the extent of about 60%.

7. A catheter as defined in claim 1, wherein said catheter is small enough relative to the blood-vessel into which it is to be inserted that it will not substantially impede the flow of blood therethrough.

* * * * *